(12) United States Patent
Helfer et al.

(10) Patent No.: US 11,644,123 B2
(45) Date of Patent: May 9, 2023

(54) DEVICE AND METHOD FOR CONDITIONING FLOW THROUGH A VALVE ASSEMBLY

(71) Applicant: FISHER CONTROLS INTERNATIONAL LLC, Marshalltown, IA (US)

(72) Inventors: Wade J. Helfer, Ames, IA (US); Anthony R. Apland, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 1011 days.

(21) Appl. No.: 16/383,265

(22) Filed: Apr. 12, 2019

(65) Prior Publication Data

US 2019/0316707 A1 Oct. 17, 2019

Related U.S. Application Data

(60) Provisional application No. 62/658,356, filed on Apr. 16, 2018.

(51) Int. Cl.
*F16K 47/08* (2006.01)
*F16K 47/02* (2006.01)
*F16K 1/22* (2006.01)

(52) U.S. Cl.
CPC .............. *F16K 47/08* (2013.01); *F16K 1/22* (2013.01); *F16K 47/02* (2013.01)

(58) Field of Classification Search
CPC .................................. F16K 47/08; F16K 1/22
See application file for complete search history.

(56) References Cited

U.S. PATENT DOCUMENTS 4,402,485 A * 9/1983 Fagerlund ......... F16L 55/02763
181/254
5,937,901 A 8/1999 Bey
(Continued)

FOREIGN PATENT DOCUMENTS

DE 19841215 A1 4/2000
WO WO-2016/001475 A1 1/2016

OTHER PUBLICATIONS

Emerson Process Management, "The Silent Treatment: Fisher Solution to Noise Problems," D351989X012/MX94 (H:), 16 Pages, Feb. 2012.
(Continued)

*Primary Examiner* — Eric Keasel
(74) *Attorney, Agent, or Firm* — Marshall, Gerstein & Borun LLP (57) ABSTRACT

A flow conditioner of a valve assembly includes a body including a longitudinal axis, a first end, a second end, and a flow path connecting the first end and the second end. A non-planar surface is formed in the first end of the body. A plurality of channels define the flow path and extend parallel to the longitudinal axis. At least one channel of the plurality of channels has a length different from a length of an adjacent channel of the plurality of channels. A cylindrical housing surrounds the plurality of channels and includes a first end and a second end. The first end is proximally located to the first end of the body. The non-planar surface of the first end is defined in part by an end of the at least one channel of the plurality of channels.

12 Claims, 10 Drawing Sheets

(56) References Cited

U.S. PATENT DOCUMENTS

| | | | | |
|---|---|---|---|---|
| 5,988,586 A | * | 11/1999 | Boger | F16K 47/08 |
| | | | | 138/44 |
| 2011/0073789 A1 | | 3/2011 | Yeary et al. | |
| 2018/0106383 A1 | | 4/2018 | Kuhlman et al. | |

OTHER PUBLICATIONS

International Search Report and Written Opinion for PCT/US2019/025963, dated Jun. 27, 2019.

* cited by examiner

DEVICE AND METHOD FOR CONDITIONING FLOW THROUGH A VALVE ASSEMBLY

FIELD OF DISCLOSURE

The present disclosure generally relates to a valve assembly, and, more particularly, to a flow conditioner of a valve assembly and a method of conditioning flow through a valve assembly.

BACKGROUND

In some valves, unwanted noise is produced by fluctuating pressure waves that arise from fluid flowing through a control valve. Hydrodynamic noise, for example, may be caused by cavitation, which is the formation and collapse of vapor cavities of a flow stream subject to rapid pressure changes. When the vapor cavities in the fluid are subject to higher pressure, the vapor cavities implode and can generate an intense shock wave that can damage internal portions of the valve or produce audible noise. Aerodynamic noise, for example, may be caused by turbulent flow of gas or vapors. Flow conditioners or anti-cavitation devices may be used with control valves to control hydrodynamic and aerodynamic noise.

SUMMARY

In accordance with a first exemplary aspect, a valve assembly may include a valve body defining an inlet, an outlet, and a fluid flow path connecting the inlet and the outlet. A valve stem may be disposed in the valve body, and a control element may be operatively connected to the valve stem and disposed in the fluid flow path. The control element may be rotatable by the valve stem about a pivot axis between an open position, in which the control element permits fluid flow between the inlet and the outlet, and a closed position, in which the control element seals the inlet from the outlet. A flow conditioner may be coupled to the valve body and may include a first end, a second end, and a second flow path connecting the first end and the second end. The second flow path may be in flow communication with the fluid flow path of the valve body when the control element is in the open position. The first end of the flow conditioner may have a non-planar surface arranged to permit rotation of the control element about the pivot axis between the closed position and the open position.

In accordance with a second exemplary aspect, a flow conditioner may include a body including a longitudinal axis, a first end, a second end, and a flow path connecting the first end and the second end. A non-planar surface may be formed in the first end of the body, and a plurality of channels may define the flow path and may extend parallel to the longitudinal axis. At least one channel of the plurality of channels may have a length different from a length of an adjacent channel of the plurality of channels. A cylindrical housing may surround the plurality of channels and may include a first end and a second end. The first end may be proximally located to the first end of the body. The non-planar surface of the first end may be defined in part by an end of the at least one channel of the plurality of channels.

In accordance with a third exemplary aspect, a method of conditioning flow through a valve assembly may include providing a valve assembly, which may include providing a valve body defining an inlet, an outlet, and a fluid flow path connecting the inlet and the outlet. Providing a valve assembly may further include providing a valve stem disposed in the valve body and providing a control element operatively connected to the valve stem and disposed in the fluid flow path. Further, the method may include providing a flow conditioner including a first end, a second end, and defining a second flow path, the first end of the flow conditioner having a non-planar surface. The method may include coupling the first end of the flow conditioner to the valve body, the first end positioned to permit rotation of the control element about the pivot axis between a closed position, in which the control element seals the inlet from the outlet and an open position, in which the control element permits fluid flow between the inlet and the outlet. Further, the method may include connecting the fluid flow path of the valve body with the second flow path of the flow conditioner.

In further accordance with any one or more of the foregoing first, second, or third aspects, a valve assembly, a flow conditioner, and a method of conditioning fluid flow may further include any one or more of the following preferred forms.

In a preferred form, the control element may include a leading edge and the non-planar surface of the flow conditioner may be contoured to match an arc of rotation of the leading edge of the control element.

In a preferred form, the valve assembly may include a plurality of channels defining the second flow path. At least one channel may include an end at least partially defining the non-planar surface of the flow conditioner.

In a preferred form, the flow conditioner may include a longitudinal axis, and the at least one channel may have a longitudinal length parallel to the longitudinal axis. A second channel of the plurality of channels may include a different longitudinal length.

In a preferred form, the at least one channel may have a cross-sectional area and the second channel may have a different cross-sectional area.

In a preferred form, the first end of the flow conditioner may be an inlet end positioned adjacent to the outlet of the valve body.

In a preferred form, the valve assembly may include a pipe coupled to the valve body, and the pipe may have a bore sized to receive the flow conditioner.

In a preferred form, the flow conditioner may be secured between the valve body and the pipe.

In a preferred form, the flow conditioner may be integrally formed with the pipe.

In a preferred form, a portion of the first end of the flow conditioner may be disposed in the valve body.

In a preferred form, the control element may include a contoured surface facing the first end of the flow conditioner when the control element is in the closed position. A portion of the non-planar surface of the first end may match a portion of the contoured surface of the control element.

In a preferred form, the non-planar surface of the first end of the flow conditioner may have a curvature defined by a radius R. The radius R may have a length of at least a distance between the pivot axis of the control element and the leading edge of the control element.

In a preferred form, wherein a portion of the body may extend beyond the first end of the cylindrical housing.

In a preferred form, the plurality of channels may be integrally formed with the cylindrical housing.

In a preferred form, body may include a diameter perpendicular to the longitudinal axis. A cross-sectional area of a channel of the plurality of channels may vary along the diameter of the body.

In a preferred form, a cross-sectional shape of the at least one channel of the plurality of channels may be non-circular.

In a preferred form of the method, coupling the flow conditioner may include positioning the first end of flow conditioner adjacent the outlet of the valve body.

In a preferred form of the method, providing a flow conditioner may include providing a non-planar surface that is contoured to match an arc of rotation of a leading edge of the control element.

In a preferred form of the method, providing a flow conditioner may include custom manufacturing a flow conditioner by additive manufacturing. Custom manufacturing may include identifying a geometry of the control element and forming the non-planar surface of the flow conditioner to match the geometry of the control element.

DETAILED DESCRIPTION

The present disclosure is generally directed to a flow conditioner, a valve assembly including a flow conditioner, and a method of conditioning fluid flow through a valve.

Figure 1:
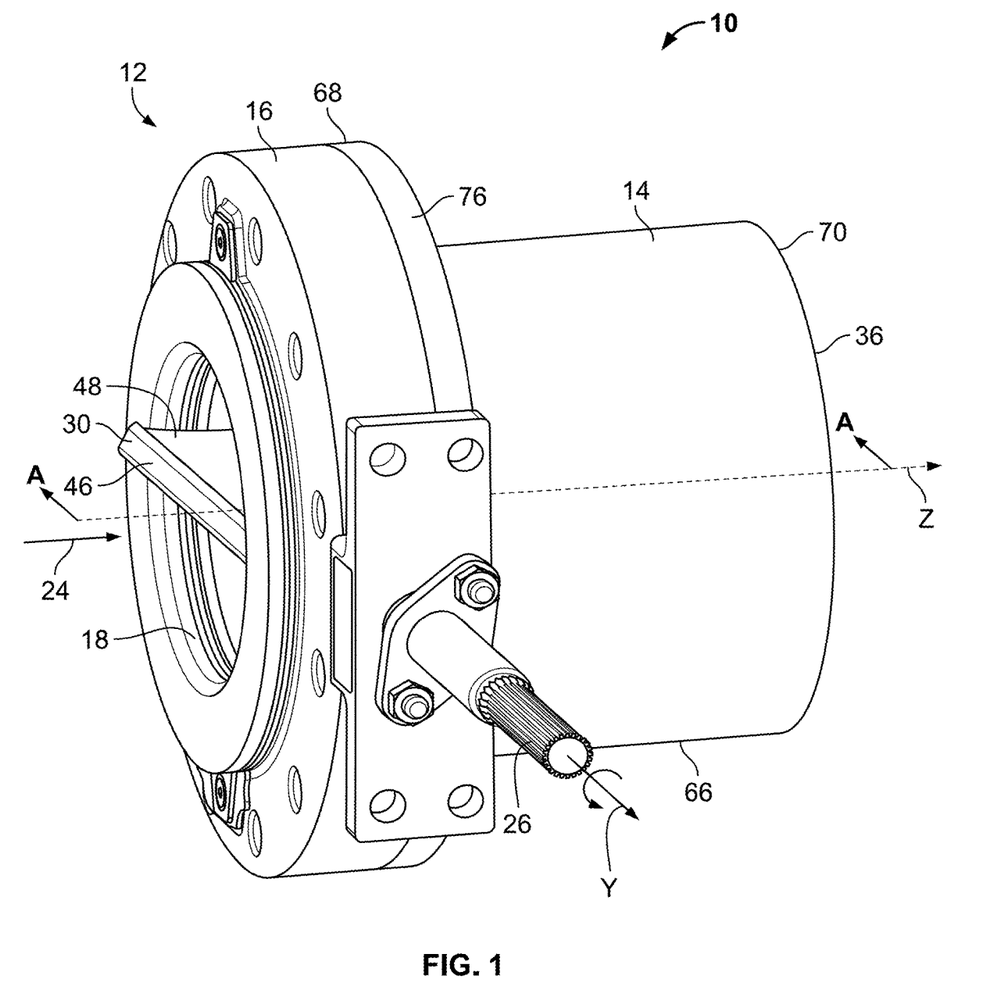
FIG. 1 is a perspective view of a valve assembly including a flow conditioner assembled in accordance with the teachings of a first exemplary arrangement of the present disclosure and showing a control element of the valve assembly in a partially open position.
Figure 2:
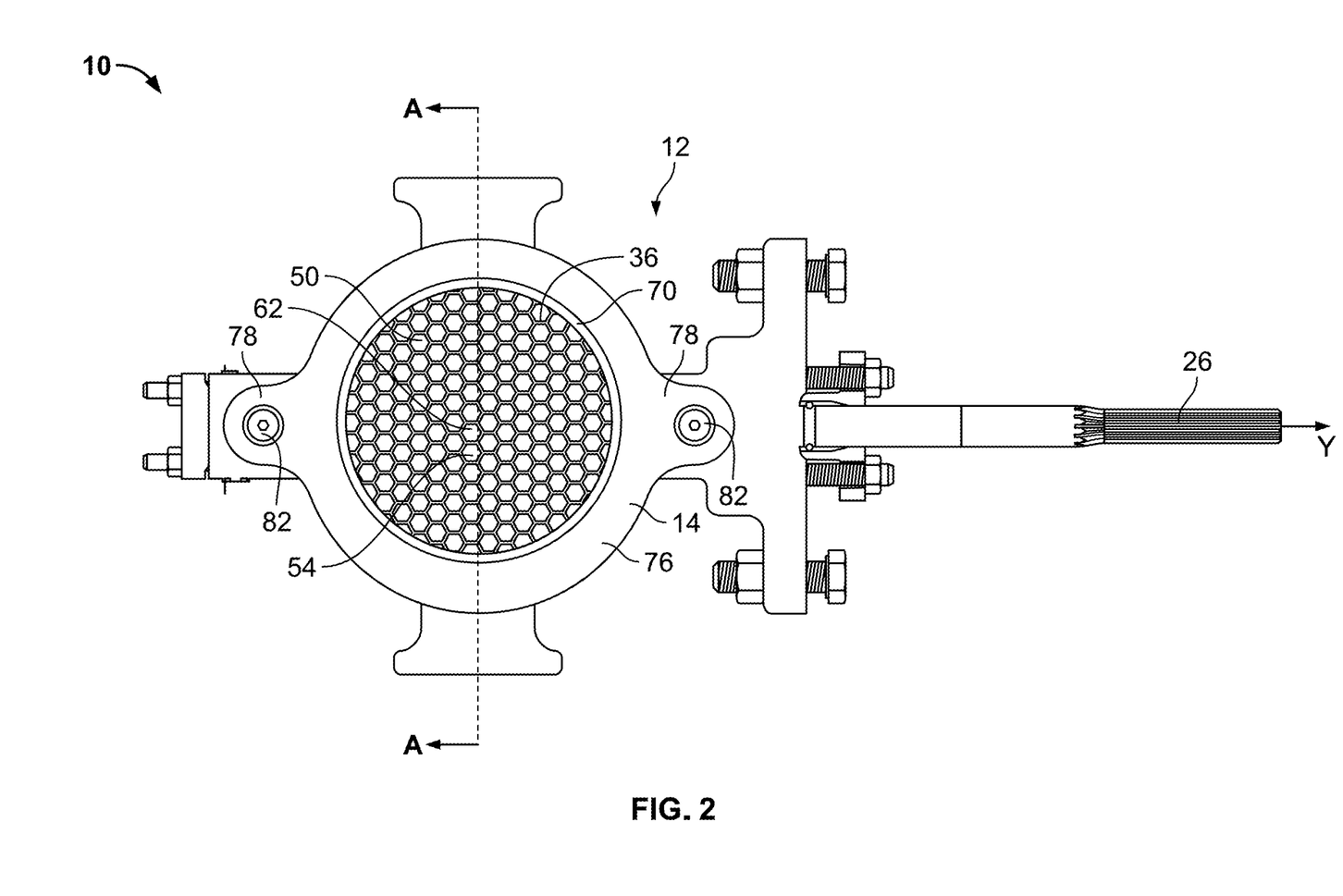
FIG. 2 is a rear elevational view of the valve assembly of FIG. 1 and showing a second end of the flow conditioner of FIG. 1.
Figure 3:
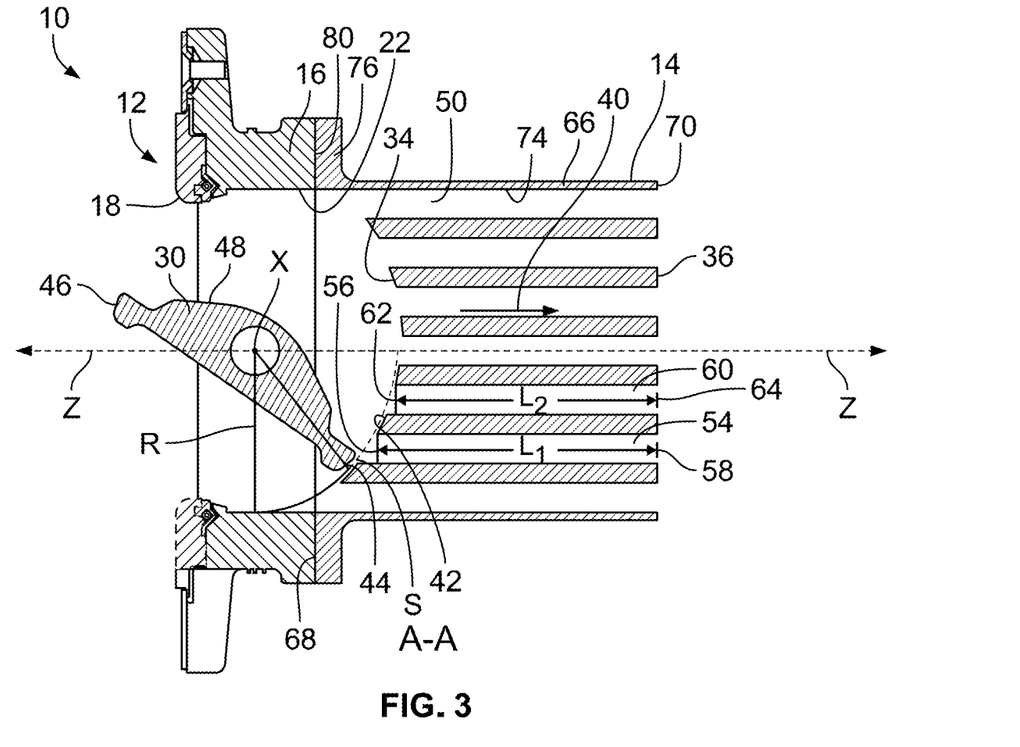
FIG. 3 is a cross-sectional side view of the valve assembly of FIG. 1 taken at A-A of FIGS. 1 and 2.

In FIGS. 1 through 3, a first exemplary rotary valve assembly 10 includes a control valve 12 and a flow conditioner 14 and is constructed according to the teachings of the present disclosure. The control valve 12 includes a valve body 16 defining an inlet 18, an outlet 22, and a fluid flow path 24 connecting the inlet 18 and the outlet 22 when the valve 12 is open, or at least partially open. A valve stem 26 is disposed in the valve body 16, and is rotatable to control the opening and closing of the valve 12 by rotating a control element 30. The control element 30 is operatively coupled to the valve stem 26, is disposed in the fluid flow path 24, and controls fluid flow through the valve body 16. The control element 30 is rotatable by the valve stem 26 about a pivot axis X between an open position (a partially open position shown in FIGS. 1 and 3), in which the control element 30 permits fluid flow between the inlet 18 and the outlet 22, and a closed position, in which the control element 30 seals the inlet 18 from the outlet 22 of the valve body 16. The control element 30 may have any shape and/or configuration to prevent fluid from flowing through the inlet 18 when the control element 30 is in the closed position, and to allow fluid flow through the inlet 18 when the control element 30 is in the open position or partially open position. The flow conditioner 14 is coupled to the valve body 16 and includes a first end 34, a second end 36, and a second flow path 40 connecting the first end 34 and the second end 36. When the control element 30 is in an open or partially open position, the second flow path 40 is in flow communication with the fluid flow path 24 of the valve body 16. In the illustrated examples of FIGS. 1 and 2, the valve 12 is a butterfly valve and the control element 30 is a valve disk, however, in another example, the valve may be different rotary valve and the control element 30 may be a ball closure member.

As shown in FIG. 3, the first end 34 of the flow conditioner 14 has a non-planar surface 42 arranged to permit rotation of the control element 30 about the pivot axis X between the closed position and the open position without rubbing or contacting the flow conditioner 14. Specifically, the control element 30 includes a leading edge 44 and a trailing edge 46, and the non-planar surface 42 of the first end 34 of the flow conditioner 14 is contoured to match an arc of rotation S of the leading edge 44 of the control element 30. As shown in FIGS. 1 through 3, the flow conditioner 14 is adjacent to the outlet 22 of the valve body 16, and therefore the first end 34 is a flow inlet end and the second end 36 is a flow outlet end of the flow conditioner 14. More particularly, when the valve 12 is in the closed position, the first end 34 of the flow conditioner 14 faces a back surface 48 of the control element 30. However, in other examples, the flow conditioner 14 may be mounted to the valve body 16 such that the first end 34 is adjacent to the inlet 18 of the valve body 16. The non-planar surface 42 of the first end 34 of the flow conditioner 14 would therefore be contoured to match an arc of rotation of the trailing edge 46 of the control element 30.

Figure 4:
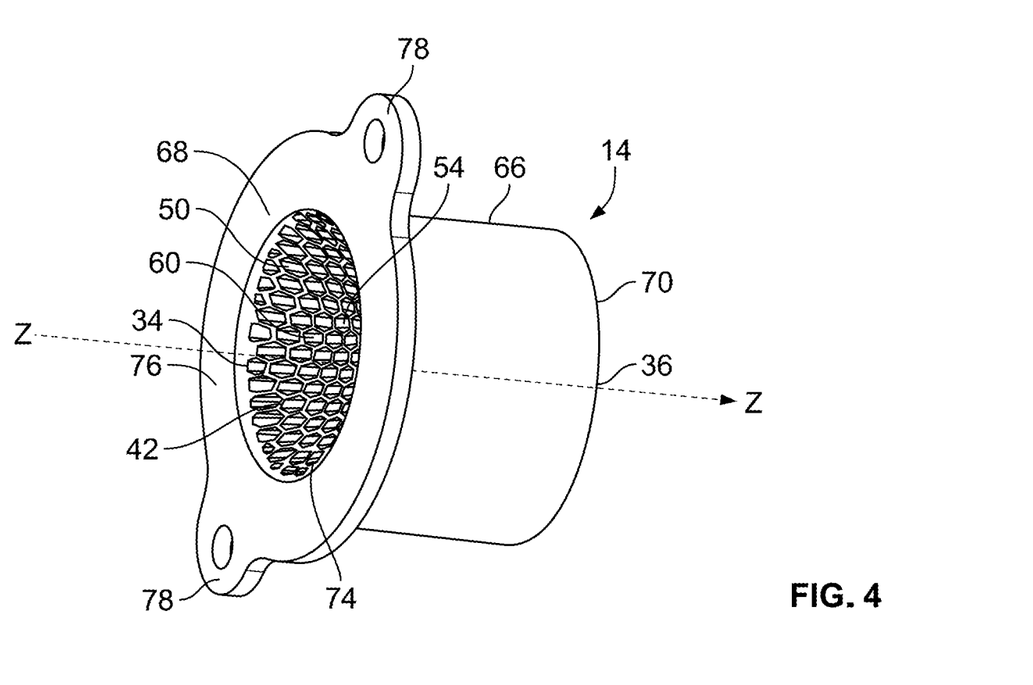
FIG. 4 is a front perspective view of the flow conditioner of FIG. 1.

The flow conditioner 14 is cylindrical and includes a longitudinal axis Z. A plurality of channels 50 define the second flow path 40 and extend between the first end 34 and the second end 36 of the flow conditioner 14. At least one channel 54 includes a first end 56, a second end 58, a longitudinal length L1 defined between the first and second ends 56, 58. The first end 56 of the channel 54 at least partially defines the non-planar surface 42 of the first end 34 of the flow conditioner 14. A second channel 60 has a longitudinal length L2 defined between a first end 62 and a second end 64 of the second channel 60. The length L1 of the first channel 54 is greater than the length L2 of the second channel 60. It will be appreciated that a plurality of ends of the plurality of channels 50 define the non-planar surface 42 of the flow conditioner 14. As shown in FIG. 4, the plurality of ends are arranged to form a spherical impression or contour to permit a full rotation (e.g. 360 degrees) of the control element 30 about the pivot axis X. In other examples, the ends of the plurality of channels 50 may be contoured in a variety of ways to permit full or partial rotation of the control element 30 without inhibiting interfering with the opening and closing of the valve 12.

As shown in FIGS. 1 through 4, the flow conditioner 14 includes a cylindrical housing 66 that surrounds the plurality of channels 60. The cylindrical housing 66 includes a first end 68 and a second end 70 where the first end 68 is proximally located to the first end 34 of the flow conditioner 14. The plurality of channels 50 may be integrally formed with the cylindrical housing 66, or a body defining the plurality of channels 50 of the flow conditioner 14 may be formed separately and then later attached to an interior surface 74 of the cylindrical housing 66. The cylindrical housing 66 includes an annular rim 76 extending radially from the housing 66 relative to the longitudinal axis Z. The rim 76, which includes one or more flanges 78, is configured to lay flat against an outer surface 80 of the valve body 16, as shown in FIG. 3, to secure the flow conditioner 14 to the valve body 16. As shown in FIG. 2, the cylindrical housing 66 of the flow conditioner 14 is coupled to the valve body 16 via one or more fasteners 82 disposed through a bore 84 of each flange 78. In this particular example, the rim 76 is secured to the outer surface 80 adjacent to the outlet 22 of the valve body 16 such that the fluid flow path 24 of the valve body 16 is in fluid communication with the second flow path 40 of the flow conditioner 14. In some examples, the cylindrical housing 66 may be a pipe, tailpiece, or other conduit coupled to the valve body 16 of the valve assembly 10.

The plurality of channels 50 have a uniform cross-sectional shape, which in this case is hexagonal. The channels 50 are linear and extend between the first end 68 of the cylindrical housing 66 and the second end 70 of the cylindrical housing 66. In this case, a plurality of second ends (e.g. 58 of the first channel 54) of the plurality of channels 50 are planar with the second end 70 of the cylindrical housing 66. The plurality of channels 50 are parallel with the longitudinal axis Z, and therefore each other, and the cross-sectional area of a majority of the plurality of channels 50 is the same. The spherical impression or contour of the first end 34 of the flow conditioner 14, as shown in FIG. 4, is symmetrical about the longitudinal axis Z of the flow conditioner 14. This symmetry permits a user to install the flow conditioner 14 at any orientation relative to the valve 12. In another example valve assembly, such as a second exemplary valve assembly 110 in FIGS. 5-6, a flow conditioner 114 includes a plurality of channels 150 with varying cross-sectional areas that are positioned to achieve a desirable flow condition when the flow conditioner 114 is installed in a particular orientation relative to the valve body 16.

Figure 5:
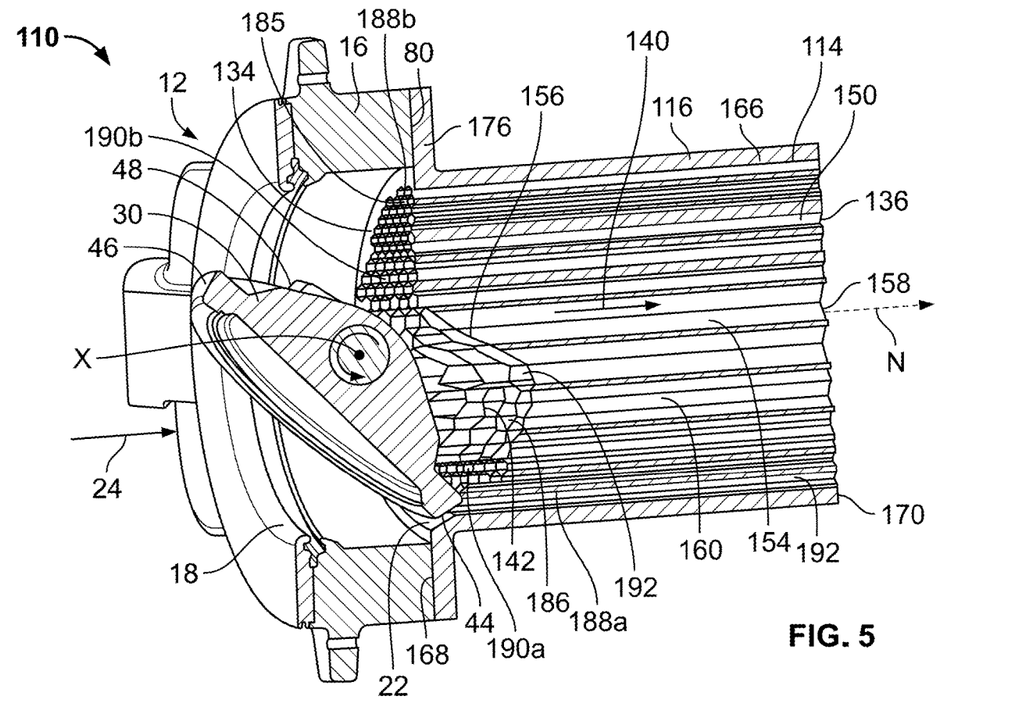
FIG. 5 is a perspective cross-sectional view of a valve assembly including a flow conditioner assembled in accordance with the teachings of a second exemplary arrangement of the present disclosure and showing a control element of the valve assembly in a partially open position.
Figure 6:
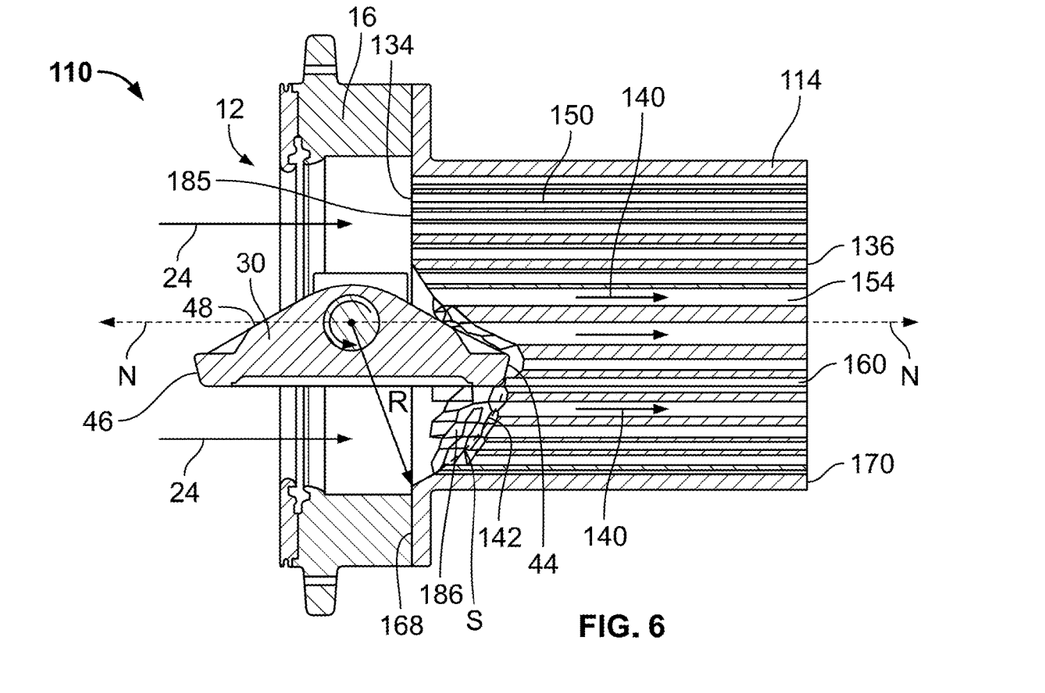
FIG. 6 is a cross-sectional side view of the valve assembly of FIG. 5 showing the control element in an open position.

Turning now to FIGS. 5-6, the second exemplary valve assembly 110 is constructed according to the teachings of the present disclosure. The second exemplary valve assembly 110 includes the first exemplary valve 12 and a second exemplary flow conditioner 114. The second exemplary flow conditioner 114 is similar to the first exemplary flow conditioner 14 described above, except that the second exemplary flow conditioner 114 has a plurality of channels 150 arranged in a different configuration. Thus, for ease of reference, and to the extent possible, the same or similar components of the flow conditioner 114 will retain the same reference numbers as outlined above with respect to the first flow conditioner 14, although the reference numbers will increase by 100. A description of many of these elements is abbreviated or even eliminated in the interest of brevity.

The flow conditioner 114 of FIGS. 5 through 8 is formed to more closely match the area rotation of the control element 30 between a closed position and an open position. By comparison to the flow conditioner 14 of FIGS. 1 through 4, a first end 134 of the flow conditioner 114 of FIGS. 5 through 8 includes a non-planar 142 surface that is contoured to permit a quarter-turn rotation (i.e. 90 degrees) of the control element 30 about the pivot axis X. The first end 134 includes a first portion 185 of the plurality of channels 150 with ends that are relatively planar, and a second portion 186 of the plurality of channels 150 with ends that define a contour of the non-planar surface 142. The first portion 185 is proximally located to the trailing edge 46 of the control element 30 when the control element 30 is the in closed position, and the second portion 186 is proximally located to the leading edge 44 during rotation of the control element 30. The first end 134 of the flow conditioner 114 is shaped to match both the travel path of the leading edge 44 and the back surface 48 of the control element 30 to place the flow channels 150 closer to the control element 30. In this example, the flow conditioner 114 is coupled to the valve body 16 at a particular orientation to achieve a desirable flow characteristic. Additionally, a pattern and variation in cross-sectional shape of the plurality of channels 150 of the flow conditioner 114 adds more complexity to more closely match a geometry of a particular valve 12 or control element 30.

Figure 7:
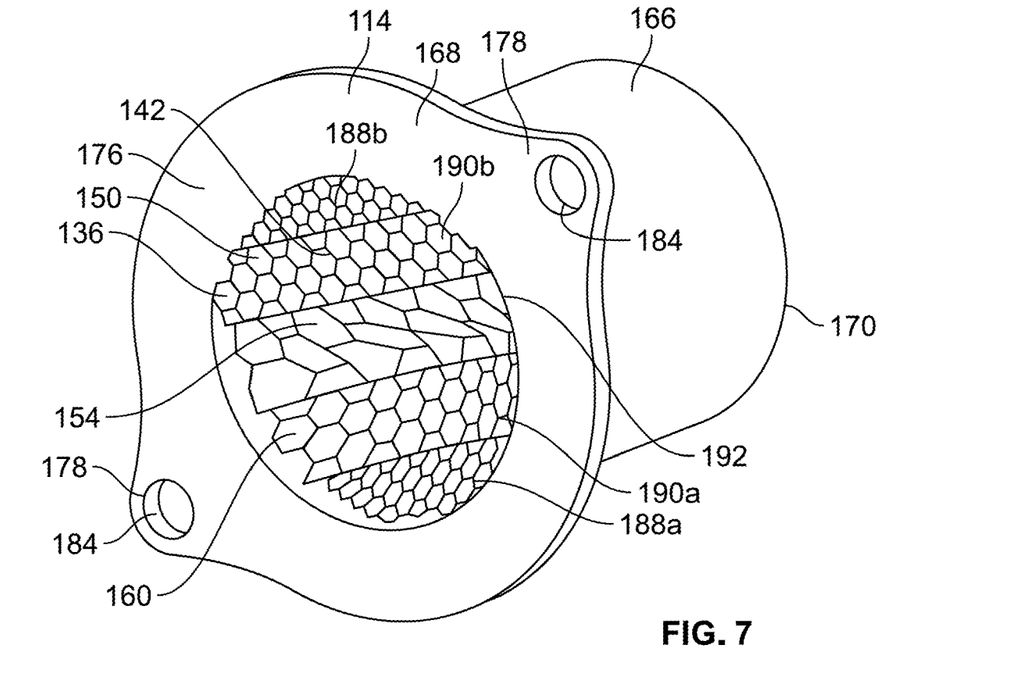
FIG. 7 is a front perspective view of the flow conditioner of FIG. 5.
Figure 8:
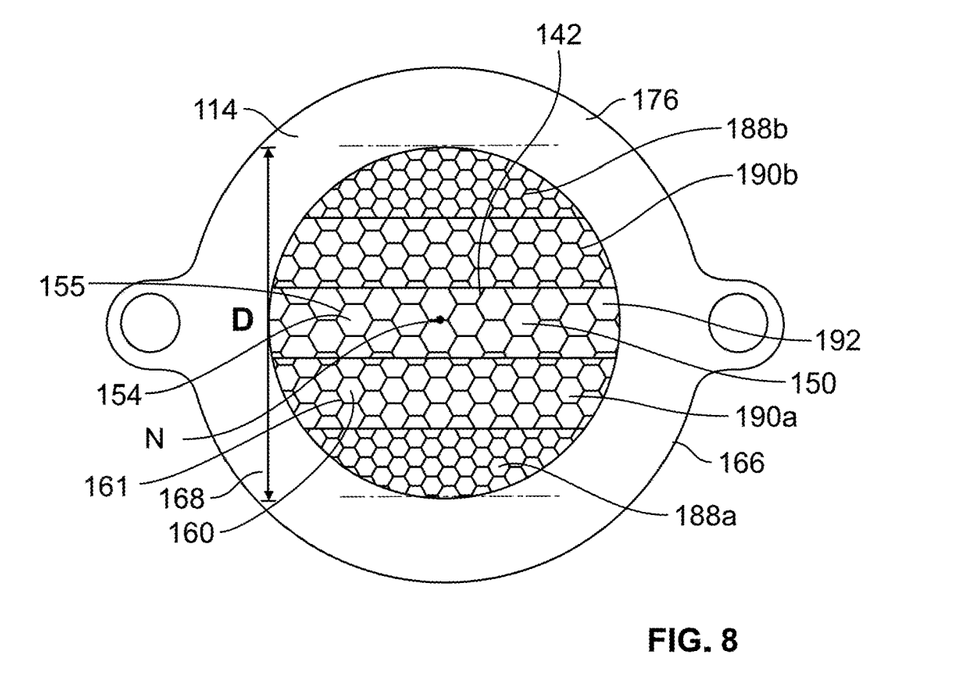
FIG. 8 is a front elevational view of the flow conditioner of FIG. 5.

The flow conditioner 114 is arranged to condition fluid flowing from the first fluid flow path 24 through a second fluid flow path 140 of the flow conditioner 114 to achieve certain flow condition at a second or outlet end 136 of the flow conditioner 114. As best shown in FIGS. 7 and 8, the plurality of flow channels 150 have different cross-sectional areas such that the cross-sectional area of a flow channel varies along a diameter D of the flow conditioner 114. For example, the flow conditioner 114 is divided into first, second, third, fourth, and fifth sections 188a, 188b, 190a, 190b, and 192 in which a cross-sectional area of a channel 150 increases along the diameter D and in toward a longitudinal axis N of the flow conditioner 114. First and second sections 188a and 188b of the first end 134 are the furthest sections from the longitudinal axis N of the flow conditioner 114 and the channels 50 of the first and second sections 188a, 188b have the smallest cross-sectional area. At lower travel positions of the control element 30 (i.e. when the control element 30 is rotated at a small angle about the pivot axis X), the first section 188a is exposed to fluid flow and receives fluid flowing through the valve 12 before the other sections 188b, 190a, 190b, 192 receive fluid flow from the outlet 22 of the valve 12. The flow channels 150 of the third and fourth sections 190a and 190b have a larger cross-sectional area than the first and second sections 188a, 188b, and the fifth section 192 has the largest cross-sectional area. As the control element 30 rotates about the pivot axis X, the cross-sectional area of the plurality of channels 150 increases from the first section 188a to the third section 190a and finally the fifth section 192, where the cross-sectional area of the channels 150 is the largest, to minimize flow restriction through the flow conditioner 114. Additionally, the smaller cross-sectional areas of the first and second sections 188a, 188b, help keep a backpressure present when the control element 30 rotates to a partially open position.

Similar to the first flow conditioner 14, the second exemplary flow conditioner 114 includes a first flow channel 154 having a length that is different than a length of a second flow channel 160. However, in contrast to the first and second flow channels 54 and 60 of the first flow conditioner 14, the first and second channels 154 and 160 of the second flow conditioner 114 also have different cross-sectional areas. In this example, a cross-sectional area 155 of the first channel 154 is greater than a cross-sectional area 161 of the second channel 160. However, both the first and second channels 154 and 160 have hexagonal cross-sectional shapes and extend linearly through the flow conditioner 114.

Figure 9:
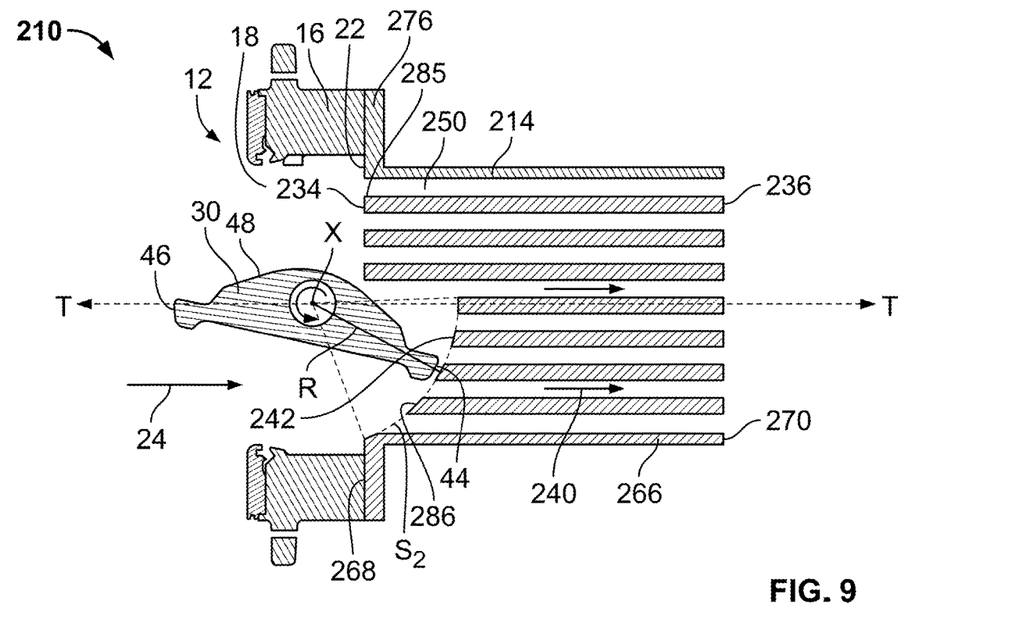
FIG. 9 is cross-sectional side view of a valve assembly including a flow conditioner assembled in accordance with the teachings of a third exemplary arrangement of the present disclosure and showing a control element of the valve assembly in a partially open position.

Turning now to FIG. 9, a third exemplary valve assembly 210 is constructed according to the teachings of the present disclosure. The third exemplary valve assembly 210 includes the first exemplary valve 12 and a third exemplary flow conditioner 214. The third exemplary flow conditioner 214 is similar to the first exemplary flow conditioner 14 described above, except that the third exemplary flow conditioner 214 has a plurality of channels 250 arranged in a different configuration. Thus, for ease of reference, and to the extent possible, the same or similar components of the flow conditioner 214 will retain the same reference numbers as outlined above with respect to the first flow conditioner 14, although the reference numbers will increase by 200. A description of many of these elements is abbreviated or even eliminated in the interest of brevity.

Figure 10:
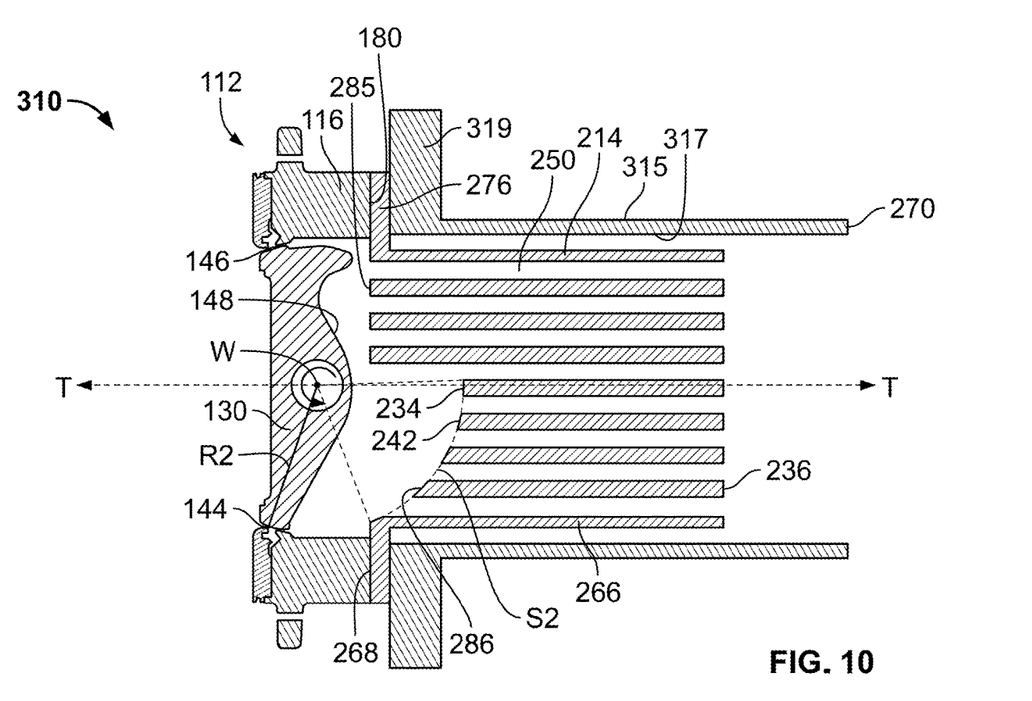
FIG. 10 is a cross-sectional side view of a valve assembly including the third exemplary flow conditioner of FIG. 9 assembled in accordance with the teachings of a fourth exemplary arrangement of the present disclosure and showing a control element of the valve assembly in a closed position.
Figure 11:
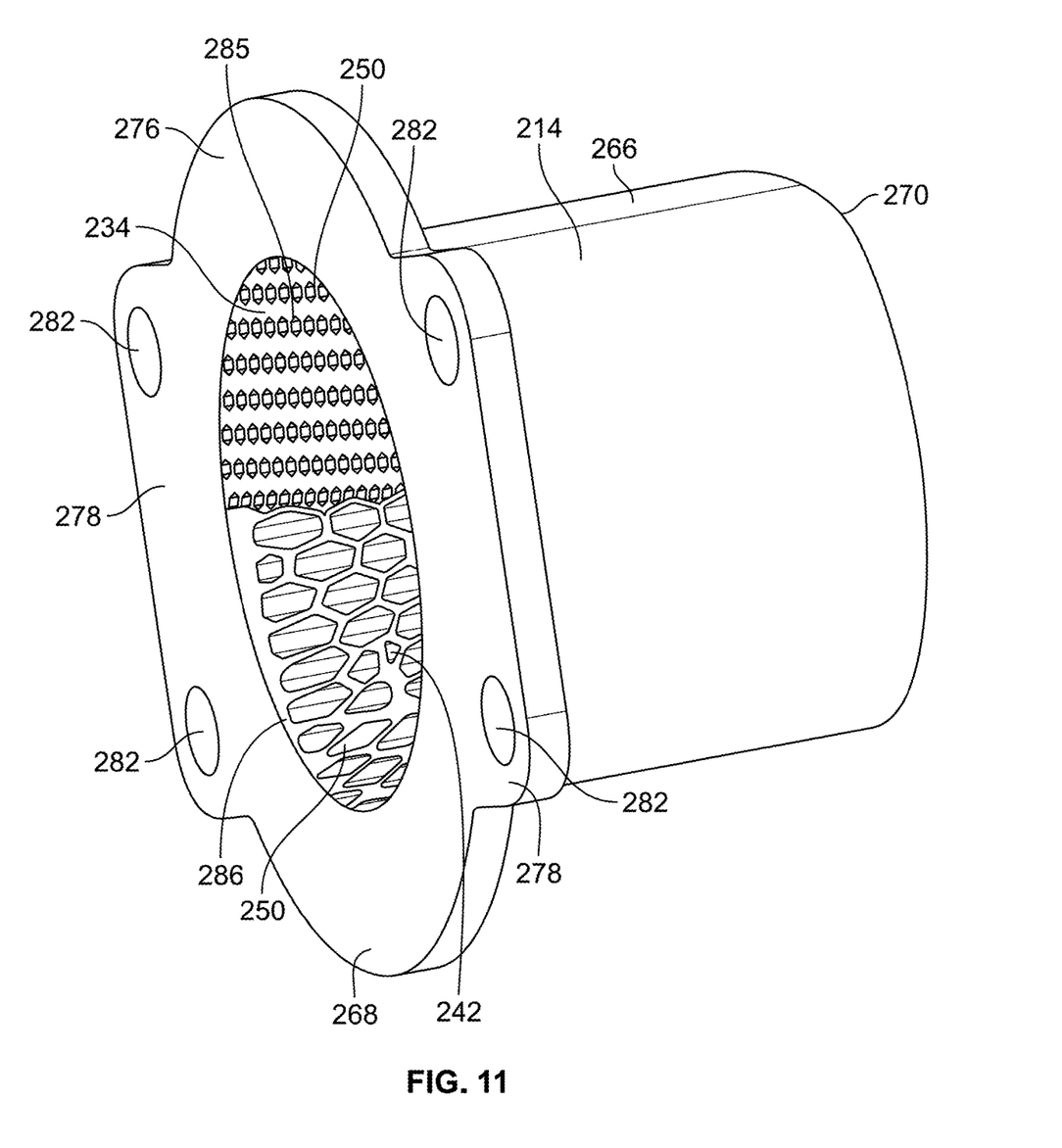
FIG. 11 is a front perspective view of the flow conditioner of FIGS. 9 and 10.

The flow conditioner 214 in FIGS. 9 through 11 is arranged to work with different configurations of rotary valves and valve assemblies. In FIG. 9, the flow conditioner 214 is coupled to the first exemplary valve 12 in a third exemplary valve assembly 210, and in FIG. 10, the flow conditioner 214 is coupled to a second exemplary valve 112 in a fourth valve assembly 310. The second exemplary valve 112 of FIG. 10 is similar to the first exemplary valve 12 described above, except that a control element 130 of the second exemplary valve 112 has a different configuration. Thus, for ease of reference, and to the extent possible, the same or similar components of the valve 112 will retain the same reference numbers as outlined above with respect to the first valve 12, although the reference numbers will increase by 100. A description of many of these elements is abbreviated or even eliminated in the interest of brevity.

As shown in FIGS. 9 through 11, a first or inlet end 234 of the flow conditioner 214 is shaped such that the flow conditioner 214 permits the control element 30 of valve 12 (or a control element 130 of the valve 112 in FIG. 10) to rotate between the closed position and the open position. A non-planar surface 242 of the first end 234 is defined by ends of a plurality of flow channels 250. Similar to the first end 134 of the second exemplary flow conditioner 114, the first end 234 of the third exemplary flow conditioner 214 is contoured to permit a quarter-turn rotation (i.e. 90 degrees) of the control element 30, 130 about the pivot axis X, W, respectively. In other words, the first end 234 is defined by both a first portion 285 of the plurality of channels 250 with ends that are relatively planar, and a second portion 286 of the plurality of channels 250 with ends that form a contour of the non-planar surface 242. The second portion 286 of the first end 234 of the flow conditioner 214 is shaped to receive a leading edge 44, 144 of the control element 30, 130 when the control element 30, 130 rotates about a pivot axis X, W. The first portion 285 is proximally located to a trailing edge 46, 146 when the control element 30, 130 is in the closed position. In other words, the second portion 286 is contoured to match an arc S2 of rotation of either the leading edge 44 of the first control element 30 with radius R or the leading edge 144 of the second control element 130 with a radius R2. The radius R of the first control element 30 may be the same or different from the radius R2 of the second control element 30, however, the arc of rotation S2 of the first end 234 is shaped to accommodate the path of rotation of both control elements 30, 130.

As shown in FIG. 11, the first portion 285 may include flow channels 250 having a smaller cross-sectional area than the flow channels 250 of the second portion 286. It may be understood that the cross-sectional area of the flow channels 250 may be the same for each of the first and second portion 285, 286, or the first and second portions 285, 286 may be further divided to provide a wider range of cross-sectional areas.

In FIG. 10, the fourth exemplary valve assembly 310 also includes a downstream conduit or pipe 315. The pipe 315 includes a bore 317 sized to receive the flow conditioner 214. An annular rim 276 of the flow conditioner 214 is secured (e.g. fastened, attached, welded, clamped) between an outer surface 180 the valve body 116 and a flange 319 of the pipe 315 by a plurality of fasteners (not shown). In one example, the flow conditioner may be integrated with the outlet. The flow conditioner may be integrated with a conduit, such as a pipe or tailpiece, mounted to the valve body.

Figure 12:
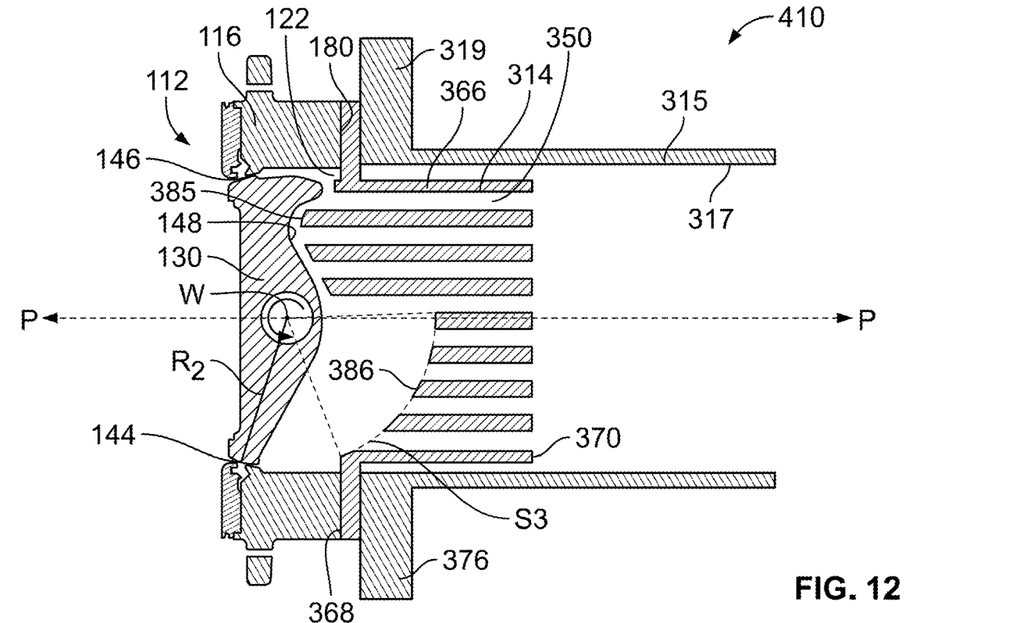
FIG. 12 is cross-sectional side view of a valve assembly including a fourth exemplary flow conditioner disposed within a pipe and assembled in accordance with the teachings of a fifth exemplary arrangement of the present disclosure and showing a control element of the valve assembly in a closed position.
Figure 13:
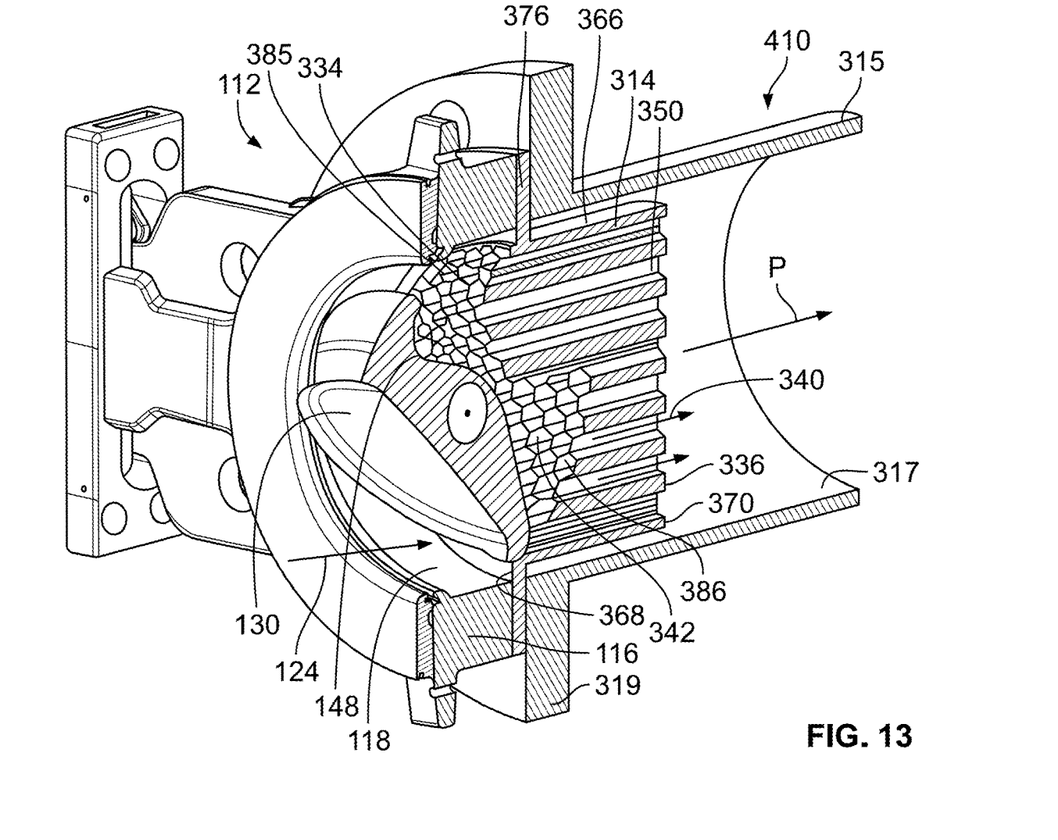
FIG. 13 is a cross-sectional perspective view of the valve assembly of FIG. 12 showing the control element in a partially open position.
Figure 14:
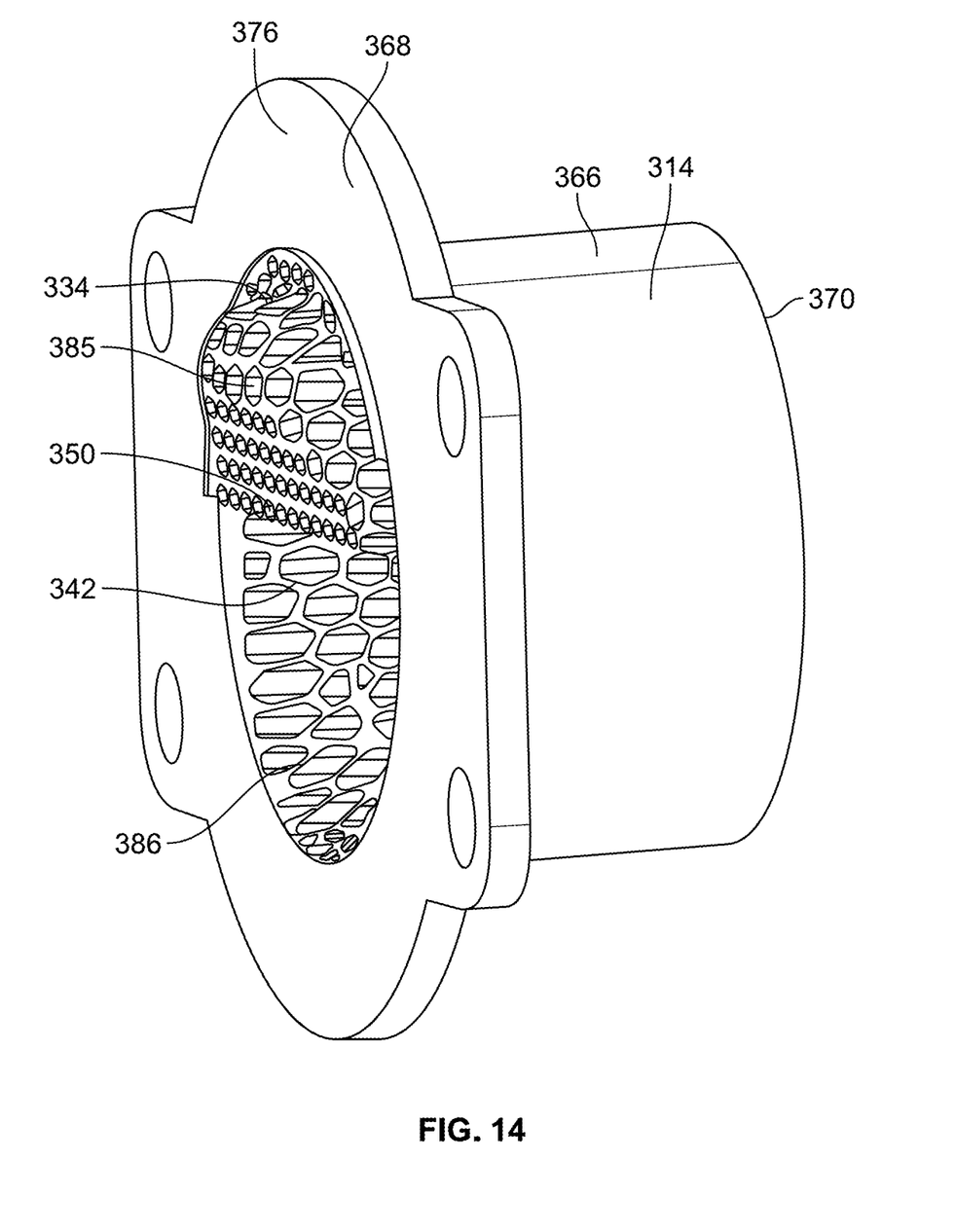
FIG. 14 is a perspective view of the flow conditioner of FIG. 12.

Turning now to FIGS. 12 and 13, a fifth exemplary valve assembly 410 is constructed according to the teachings of the present disclosure. The fifth exemplary valve assembly 410 includes the second exemplary valve 112 of FIG. 10 and a fourth exemplary flow conditioner 314, which is also depicted in FIG. 14. The fourth exemplary flow conditioner 314 is similar to the third exemplary flow conditioner 214 described above, except that the fourth exemplary flow conditioner 314 has a plurality of channels 150 arranged in a different configuration. Thus, for ease of reference, and to the extent possible, the same or similar components of the flow conditioner 314 will retain the same reference numbers as outlined above with respect to the third flow conditioner 214, although the reference numbers will increase by 100. A description of many of these elements is abbreviated or even eliminated in the interest of brevity.

In FIGS. 12 through 14, a cylindrical housing 366 at least partially surrounds the plurality of flow channels 350 of the flow conditioner 314. In other words, a first portion 385 of the first end 334 of the flow conditioner 314 extends beyond a first end 368 of the cylindrical housing 366 and into the outlet 122 of the valve body 116. Specifically, the first portion 385 of the first end 334 is contoured to match the contoured outer surface 148 of the control element 130 such that the first portion 385 of the flow conditioner 315 is adjacent to the control element 130 when the control element 130 is in the closed position. Similar to the second portion 286 of the inlet end 234 of the third exemplary flow conditioner 214, the second portion 386 is shaped to match an arc of rotation S3 of the leading edge 144 of the control element 130 for a quarter-turn rotation about the pivot axis W. By comparison to the third flow conditioner 214, the fourth exemplary flow conditioner 314 may be specifically arranged to more closely match the arc of rotation, and may include a radius of curvature that corresponds to the radius R2 of the control element 130.

Figure 15:
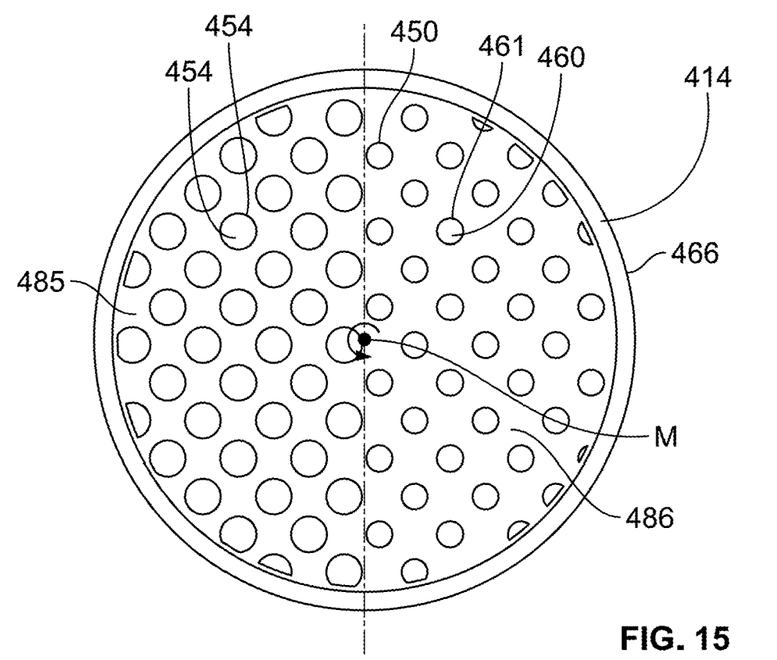
FIG. 15 is a cross-sectional view of a fifth exemplary flow conditioner in accordance with the teachings of the present disclosure.
Figure 16:
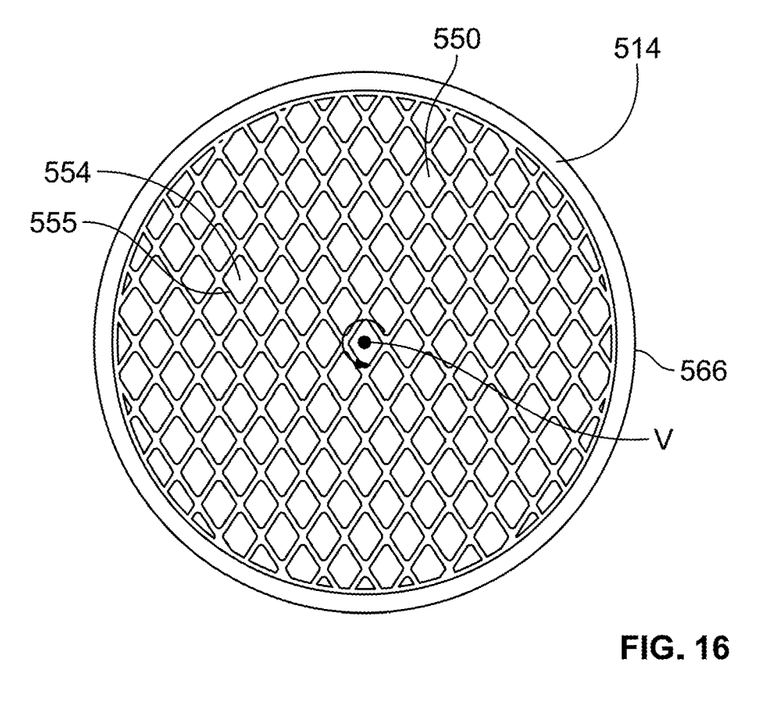
FIG. 16 is a cross-sectional view of a sixth exemplary flow conditioner in accordance with the teachings of the present disclosure.

In FIG. 15, a fifth exemplary flow conditioner 414 is constructed according to the teachings of the present disclosure, and in FIG. 16, a sixth exemplary flow conditioner 514 is constructed according to the teachings of the present disclosure. The fifth and sixth exemplary flow conditioners 414, 514 are similar to the first exemplary flow conditioner 14 described above, except that a plurality of channels 450 of the fifth exemplary flow conditioner 414 and a plurality of channels 550 of the sixth exemplary flow conditioner 514 are arranged differently. Thus, for ease of reference, and to the extent possible, the same or similar components of each flow conditioner 414 and 514 will retain the same reference numbers as outlined above with respect to the first flow conditioner 14, although the reference numbers will increase by 300 and 400, respectively.

In FIG. 15, a first portion 485 and a second portion 486 of the plurality of channels 450 are representative of a pattern of channels 450 formed at an inlet end of the flow conditioner 414. A first flow channel 454 of the first portion 485 includes a circular cross-sectional shape 455, and a second flow channel 460 of the second portion 486 includes a circular cross-sectional shape 461. The cross-sectional area 455 of the first channel 454 is larger than the cross-sectional area 461 of the second flow channel 460. In FIG. 16, a majority of a plurality of channels 550 of a sixth exemplary flow conditioner 514 has a uniform cross-sectional shape and area. In particular, a flow channel 554 has a diamond cross-sectional shape 555.

Any one of the first, second, third, fourth, and fifth valve assemblies 10, 110, 210, 310, and 410 of the present disclosure is configured to condition process fluid through a valve to reduce turbulence of fluid flow and propagation of noise. The exemplary flow conditioners 14, 114, 214, 314, 414, 514 may reduce noise levels and delay onsite cavitation when coupled to rotary valves, such as butterfly valves. A method or process of conditioning fluid flow may include assembling and operating a valve assembly, and the second exemplary flow conditioner 114 of FIGS. 5-8 will be used in the following description to help illustrate conditioning fluid flow in the valve assembly 110 according to the teachings of the present disclosure. However, it will be appreciated that the method or process of conditioning fluid flow is not limited the second exemplary valve assembly 110, and may apply to any of the illustrated example valve assemblies described herein.

A method of conditioning flow includes providing the valve assembly 110 including the valve 12, such as a butterfly valve, and providing a flow conditioner 114. The method may include coupling a first end 134 of the flow conditioner 114 to a valve body 16. The first end 134 of the flow conditioner 114 is positioned to permit rotation of the control element 30 about the pivot axis X between a closed position, in which the control element 30 seals the inlet 18 from the outlet 22, and an open position, in which the control element 30 permits fluid flow between the inlet 18 and the outlet 22 and the fluid flow path 24 of the valve body 16 is in flow communication with the second flow path 40 of the flow conditioner 114. Providing a flow conditioner includes providing a flow conditioner having a non-planar surface 142 that is contoured to match an arc of rotation S of a leading edge 44 of the control element 30. More specifically, providing a flow conditioner 114 may include custom manufacturing a flow conditioner by additive manufacturing or other methods. This process may include identifying a geometry of the control element 30 and then forming the non-planar surface 42 of the flow conditioner 114 to match the geometry of the control element 30. For example, the fourth exemplary flow conditioner 314 of FIG. 12 is particularly shaped to match the contour 148 of the control element 130, which is an equal percentage control element.

It will be appreciated that the plurality of channels 50, 150, 250, 350, 450, 550 may be formed by additive manufacturing or other manufacturing methods to provide any number of different configurations with varying complexity to achieve desirable flow conditions or noise attenuating effects. The flow conditioners 14, 114, 214, 314, 414, 514 may be formed in whole or in part of a lattice structure, which is a three-dimensional arrangement or array of connected structural elements (i.e. lattice members or lattice cell units forming the plurality of channels 50, 150, 250, 350, 450, 550) that may be arranged diagonally, horizontally, and vertically to form a plurality of round, diamond, rectangular or other polygonal shape openings in a pattern. The openings may together or separately form the plurality of channels 50, 150, 250, 350, 450, 550 of the lattice portions of the flow conditioners 14, 114, 214, 314, 414, 514. The plurality of lattice members may be separate elements, or the lattice members may be joined together (or formed together) to make an integral structure having a lattice pattern. Additionally, the cylindrical housing 66, 166, 266, 366, 466, 566 of each flow conditioner 14, 114, 214, 314, 414, 514 may be integrally formed with a body defining the plurality of channels 50, 150, 250, 350, 450, 550 forming a unitary device.

Creating a customized flow conditioner 14, 114, 214, 314, 414, 514 using an AM technique or process that builds three-dimensional objects by adding successive layers of material on a material or receiving surface. The AM technique may be performed by any suitable machine or combination of machines. The AM technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The AM technique may include any of several techniques or processes, such as, for example, a stereolithography ("SLA") process, digital light processing ("DLP"), a fused deposition modeling ("FDM") process, a multi-jet modeling ("MJM") process, a selective laser sintering ("SLS") process, a selective laser melting ("SLM") process, an electronic beam melting ("EBM") process, and an arc welding AM process. In some embodiments, the AM process may include a directed energy laser deposition process. Such a directed energy laser deposition process may be performed by a multi-axis computer-numerically-controlled ("CNC") lathe with directed energy laser deposition capabilities. Other manufacturing techniques may be utilized to create a flow conditioner according to the present disclosure, and are not limited to the techniques herein. Additionally, the flow conditioner 14, 114, 214, 314, 414, 514 may be fabricated using other manufacturing processes and techniques outside of the AM technical field, such as, for example, investment casting and welding.

In addition to the examples illustrated herein, the pattern of flow channels may be specifically designed for particular processes or applications. The skilled person would understand that AM may utilize any number three-dimensional printers or AM machines that are available and that are suitable for making and designing a flow conditioner in accordance with the present disclosure. AM enables a design-driven manufacturing process such that the flow conditioner of a valve assembly may be manufactured based on the design requirements, and not based on the restriction and limited capabilities of manufacturing methods. AM affords design flexibility, integration of new materials and structures, and customization of body components. Additive manufacturing may be used for designing light, stable, customizable and complex structures, thereby saving a manufacturer costs related to labor and materials associated with finishing processes. Additive manufacturing allows each flow conditioner to be customized according to the requirements of the process for which it is used.

For example, a custom-manufactured flow conditioner 14, 114, 214, 314, 414, 514, made by AM techniques or other methods, may achieve desirable flow characteristics, strength properties, or other traits to effectively reduce noise and turbulence within, or downstream from, a control valve. The plurality of channels 50, 150, 250, 350, 450, 550 arranged in the flow conditioners 14, 114, 214, 314, 414, 514 described herein may condition fluid flow through a control valve or conduit to extend the life of the control valve or conduit. The plurality of channels 50, 150, 250, 350, 450, 550 create multiple, individual flow paths, which help restore a desired velocity profile and eliminate secondary flows and swirl typically caused by pipe elbows and complex piping arrangements. By separating the flow path of the control valve into multiple channels, multiple smaller jet streams are created, which may help reduce flow turbulence. In another example, the pattern of the plurality of channels 50, 150, 250, 350, 450, 550 may be configured in particular arrangements to create flow restrictions to permit the control element 30, 130 to rotate further in the open position.

A flow conditioner constructed according to the teachings of the present disclosure may also serve as a universal flow conditioner capable of being retrofit to a number of different rotary control valves. For example, the non-planar surfaces 42, 142, 242 of the first, second, and third exemplary flow conditioners 14, 114, and 214 are contoured so that each flow conditioner 14, 114, 214 may be used with a number of different rotary control valves, while still achieving closer placement of the flow conditioner 14, 114, 214 relative to the control element 30, 130 of the valve 12, 112. Further, each of the flow conditioners 14, 114, 214, 314, 414, 514 may be placed upstream or downstream from a control valve, within a conduit, integrated with a conduit, or clamped between two conduits in a pipeline.

The figures and description provided herein depict and describe preferred examples of a valve assembly having a flow conditioner and a flow conditioner for purposes of illustration only. One skilled in the art will readily recognize from the foregoing discussion that alternative variants of the components illustrated herein may be employed without departing from the principles described herein. Thus, upon reading this disclosure, those of skill in the art will appreciate still additional alternative structural and functional designs for flow conditioners. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A valve assembly comprising:
    a valve body defining an inlet, an outlet, and a fluid flow path connecting the inlet and the outlet, the valve body including an inlet and a downstream outlet spaced downstream from the inlet;
    a valve stem disposed in the valve body;
    a control element operatively connected to the valve stem and disposed in the fluid flow path, the control element rotatable by the valve stem about a pivot axis between an open position, in which the control element permits fluid flow between the inlet and the outlet, and a closed position, in which the control element cooperates with a seal disposed in the valve body adjacent to the inlet and thereby seals the inlet from the outlet;
    a flow conditioner coupled to the downstream outlet of the valve body and including a first end, a second end, and a second flow path connecting the first end and the second end, the second flow path in flow communication with the fluid flow path of the valve body when the control element is in the open position;
    wherein the first end of the flow conditioner has a non-planar surface arranged to permit rotation of the control element about the pivot axis between the closed position and the open position;
    wherein the first end of the flow conditioner is spaced longitudinally downstream from the seal.

2. The valve assembly of claim 1, wherein the control element includes a leading edge and the non-planar surface of the flow conditioner is contoured to match an arc of rotation of the leading edge of the control element, and wherein the non-planar surface of the flow conditioner is arranged so as to not contact the control element.

3. The valve assembly of claim 2, wherein the non-planar surface of the first end of the flow conditioner has a curvature defined by a radius R, wherein the radius R has a length of at least a distance between the pivot axis of the control element and the leading edge of the control element.

4. The valve assembly of claim 2, further comprising:
    a plurality of channels defining the second flow path,
    wherein at least one channel includes an end at least partially defining the non-planar surface of the flow conditioner; and
    wherein each of the plurality of channels extends continuously from adjacent the first end of the flow conditioner to the second end of the flow conditioner.

5. The valve assembly of claim 4, wherein the flow conditioner includes a longitudinal axis, and the at least one channel has a longitudinal length parallel to the longitudinal axis, and a second channel of the plurality of channels includes a different longitudinal length.

6. The valve assembly of claim 5, wherein the at least one channel has a cross-sectional area and the second channel has a different cross-sectional area.

7. The valve assembly of claim 1, wherein the first end of the flow conditioner is an inlet end positioned adjacent to the outlet of the valve body.

8. The valve assembly of claim 1, further comprising a pipe coupled to the valve body, the pipe having a bore sized to receive the flow conditioner.

9. The valve assembly of claim 8, wherein the flow conditioner is secured between the valve body and the pipe.

10. The valve assembly of claim 8, wherein the flow conditioner is integrally formed with the pipe.

11. The valve assembly of claim 1, wherein a portion of the first end of the flow conditioner is disposed in the valve body.

12. The valve assembly of claim 1, wherein the control element includes a contoured surface facing the first end of the flow conditioner when the control element is in the closed position, and wherein a portion of the non-planar surface of the first end matches a portion of the contoured surface of the control element.

* * * * *

UNITED STATES PATENT AND TRADEMARK OFFICE
CERTIFICATE OF CORRECTION

PATENT NO. : 11,644,123 B2
APPLICATION NO. : 16/383265
DATED : May 9, 2023
INVENTOR(S) : Wade J. Helfer et al.

It is certified that error appears in the above-identified patent and that said Letters Patent is hereby corrected as shown below:

In the Specification

At Column 3, Line 44, "is cross-sectional" should be -- is a cross-sectional --.

At Column 3, Line 57, "is cross-sectional" should be -- is a cross-sectional --.

At Column 5, Line 21, "inhibiting" should be -- inhibiting or --.

At Column 6, Lines 32-33, "is the in" should be -- is in the --.

At Column 8, Line 33, "the valve" should be -- of the valve --.

At Column 9, Line 50, "limited the" should be -- limited to the --.

At Column 10, Lines 54-55, "electronic beam melting" should be -- electron beam melting --.

At Column 11, Line 4, "number" should be -- number of --.

Signed and Sealed this
Seventeenth Day of September, 2024

Katherine Kelly Vidal
*Director of the United States Patent and Trademark Office*